May 28, 1968  W. C. MANSFIELD, JR  3,386,063
TEMPERATURE RESPONSIVE FUSES AND APPARATUS EMBODYING SUCH FUSES
Original Filed Oct. 3, 1960  2 Sheets—Sheet 1
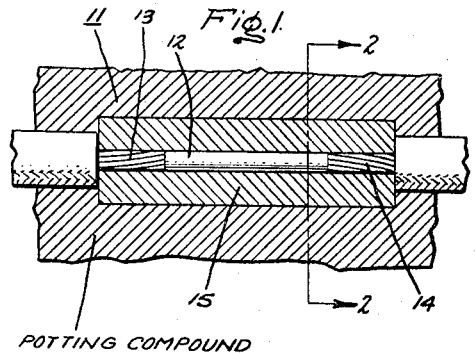
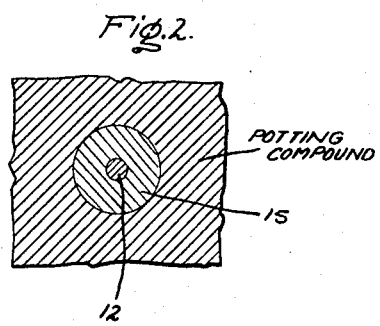
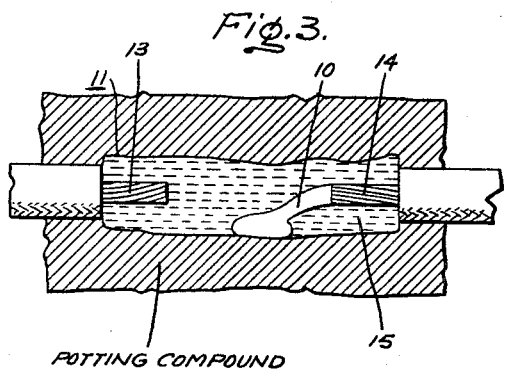
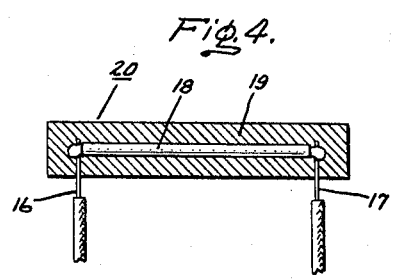
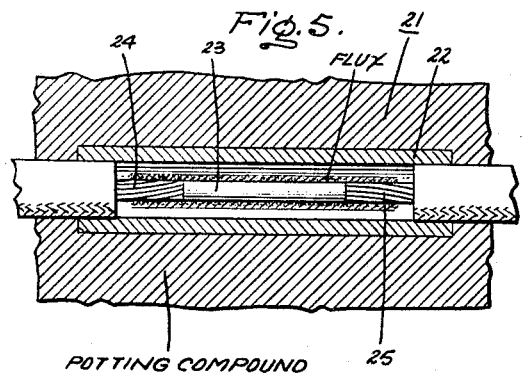
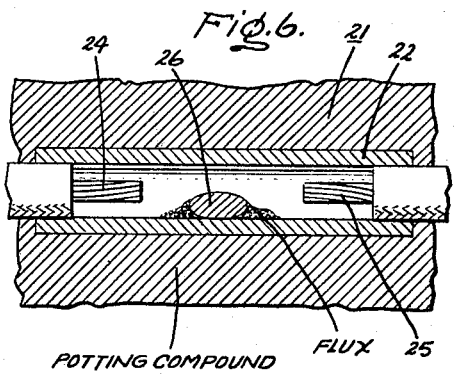
Inventor:
Walter C. Mansfield, Jr,
by Henry J. Marcinick
Attorney.

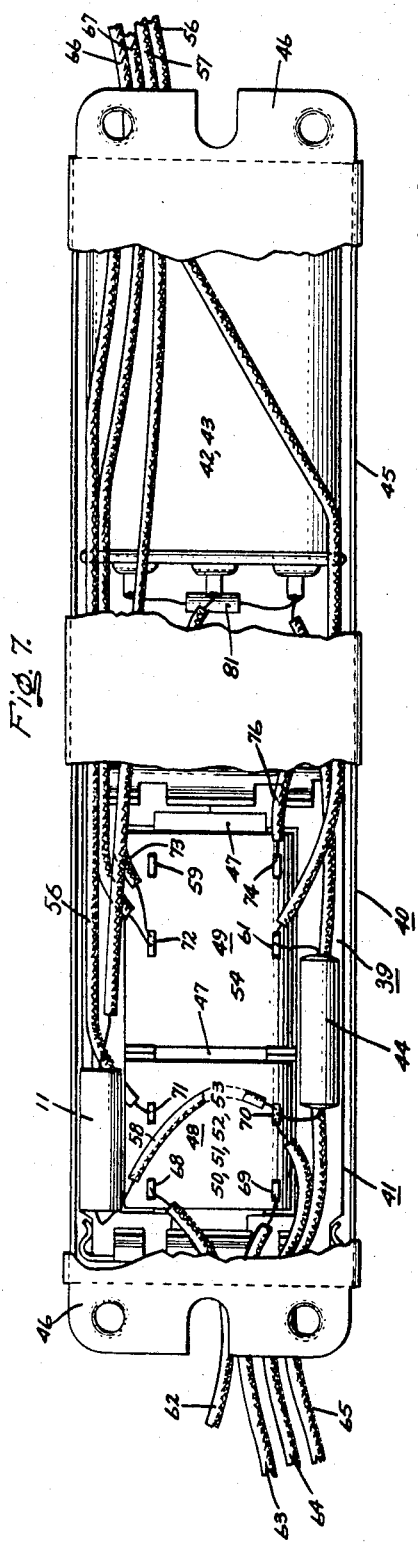
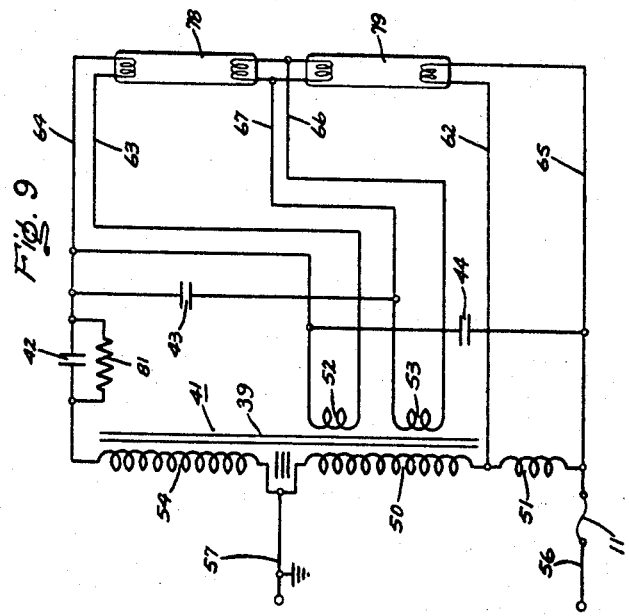
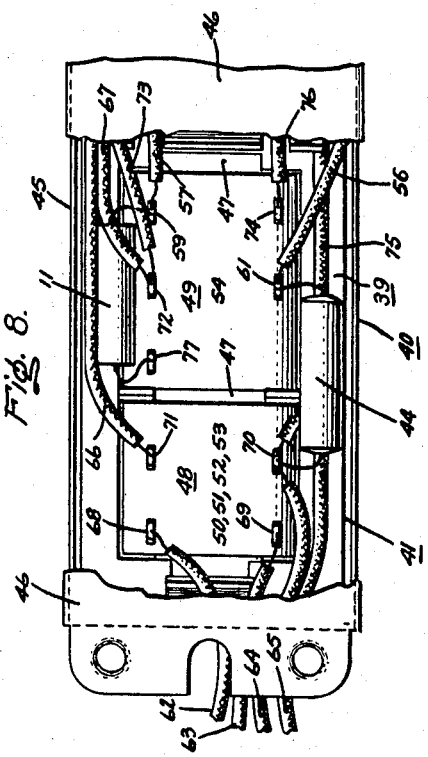

United States Patent Office 3,386,063
Patented May 28, 1968

3,386,063
TEMPERATURE RESPONSIVE FUSES AND APPARATUS EMBODYING SUCH FUSES
Walter C. Mansfield, Jr., Fort Wayne, Ind., assignor to General Electric Company, a corporation of New York
Original application Oct. 3, 1960, Ser. No. 59,867, now Patent No. 3,201,646, dated Aug. 17, 1965. Divided and this application Oct. 7, 1964, Ser. No. 402,165
9 Claims. (Cl. 337—191)

ABSTRACT OF THE DISCLOSURE

A temperature responsive fuse having a fuse body and fusible link for operation within a thermally conductive material to interrupt an electrical circuit. The fuse body is formed of a material, such as wax, which is solid at normal temperatures but which will melt before the fusible link melts to provide a liquid medium into which the melted link can collapse. An environment of oxide dispersing means is provided around the fusible link, for example as a thin sheath coating on the link, to ensure opening of the circuit when the fuse is subjected to a preselected activating temperature range.

---

This application is a division of my copending application, Ser. No. 59,867, filed on Oct. 3, 1960, now Patent No. 3,201,646, issued Aug. 17, 1965. This invention relates to electrical fuses and to electrical apparatus embodying such fuses. More particularly, the invention relates to temperature responsive fuses adapted to interrupt an electrical circuit in response to heat in the vicinity of the fuse.

In many electrical applications, it may be desirable to interrupt an electrical circuit in response to a rise in the temperature of an electrical device. A temperature responsive fuse may be used to protect the electrical device against damage resulting from overheating or to protect property in the vicinity against damage that may be caused by the overheated electrical device. Temperature responsive fuses may be used in conjunction with numerous types of electrical apparatus, such as motors, electronic circuits, transformers, fluorescent lamp ballasts and other devices.

Improper functioning of many electrical devices is often accompanied by a significant temperature rise. An example of such an electrical device is a fluorescent lamp ballast. The ballast, which usually includes a high reactance transformer and an oil-filled capacitor, is generally potted in an asphalt and sand mixture and housed a metal case. When a ballast fails electrically, the failure usually results in an overheating of the unit. The resultant overheating may cuase the potting mixture to expand and erupt from the metal case. It may cause the capacitor to expand and rupture. Thus, an overheated ballast may cause damage to the fixture and to property in the vicinity of the ballast. It is, therefore, desirable in such a device to have a temperature detecting fuse incorporated therein which will interrupt the power supplied to the device before the temperature of the unit reaches a point at which it may cause damage. If a temperature responsive fuse is incorporated in one of the internal connections of a power input lead of a ballast which is embedded in the potting compound, it will deactivate the ballast when the compound reaches a predetermined temperature and thereby prevent damage.

It is desirable that a temperature responsive fuse suitable for incorporation in an electrical apparatus, such as the fluorescent lamp ballast, be small, easy to assemble and to connect in the apparatus, and inexpensive to manufacture. In addition, where the temperature responsive fuse is to be embedded in a resinous encapsulant of a motor or in the asphaltic potting compound of a fluorescent lamp ballast, it is necessary that the temperature sensitive fuse be so designed that it will not be activated while the resinous encapsulating material is being cured or while the hot potting compound is being poured around the fuse.

Accordingly, it is an object of this invention to provide an improved temperature responsive fuse and an apparatus employing such a fuse which will achieve the desired results as set forth above.

Another object of this invention is to provide an improved temperature responsive fuse and apparatus employing such fuse wherein the fuse is embedded in an encapsulating material or potting compound and inactivates the apparatus when overheating occurs.

It is another object of the invention to provide an improved temperature responsive fuse suitable for embedding in a thermally conductive material which will reliably operate at a predetermined temperature range and be capable of withstanding exposure to temperature in excess of the predetermined temperature for relatively short intervals.

In accordance with one form of the invention, I have provided a temperature responsive fuse for operating within a thermally conductive material encasing a ballast apparatus. The temperature responsive fuse is comprised of a fusible link, a pair of lead terminals, and a fuse body substantially enclosing the fusible link. The fusible link maintains an electric current conduction path between the terminals and interrupts the current when the fusible alloy reaches a predetermined temperature range in response to the ambient temperature, the fuse body at the predetermined temperature range providing a medium for the molten fusible link to collapse and interrupt the current conduction path. Preferably the fuse is disposed adjacent to the magnetic core of the ballast.

In another aspect of the invention, the fusible link is comprised of a fusible alloy having a predetermined melting temperature range at which it is desired to have the fuse operate. Further, the fusible alloy is encased in a wax having a melting point not greater than the predetermined temperature of a fusible alloy. The wax provides a liquid environment at the predetermined temperature range so that the surface tension of the molten link will tend to cause the link to assume a spheroidal shape and thereby positively insure that the circuit is interrupted at the predetermined temperature range. The wax also provides a liquid medium in the substantially solid encapsulating material or asphaltic potting compound in which the fuse is embedded wherein the fusible link can achieve mobility when in a molten state and open the circuit.

Temperature range, as the term is used herein, denotes the temperature or temperatures at which the material melts. It will be appreciated that some materials do not have precise melting points. Thus, the term "temperature range" includes materials which have precise melting points and those that do not.

The subject matter which I regard as my invention is set forth in the appended claims. The invention itself, however, together with further objects and advantages thereof may be better understood by referring to the following description taken in connection with the accompanying drawings in which:

FIG. 1 is a sectional view of the temperature responsive electric fuse in accordance with the invention shown embedded in a potting compound;

FIG. 2 is a sectional view along line 2—2 of the thermal fuse illustrated in FIG. 1;

FIG. 3 is a sectional view corresponding to the view shown in FIG. 1 illustrating the condition of the thermal fuse of FIG. 1 immediately after it has been activated;

FIG. 4 is a sectional view illustrating another embodiment of the invention;

FIG. 5 is a sectional view of an illustrative embodiment of the invention in which a cylindrical shaped fuse body is used to encase the fusible link and provide a void wherein the molten link can collapse;

FIG. 6 is a sectional view corresponding to the view shown in FIG. 5 illustrating the condition of the fuse immediately after it has been activated;

FIG. 7 is a plan view of a ballast without a potting compound and with a portion of the cover removed, showing the ambient temperature responsive fuse of the invention utilized in a ballast circuit;

FIG. 8 is a partial view of the ballast shown in FIG. 7 showing the ambient temperature responsive fuse of the invention connected in another location in the ballast circuit of FIG. 7; and FIG. 9 is a schematic circuit diagram showing the ballast of FIG. 7 connected in circuit with a pair of fluorescent lamps.

Referring now to FIGS. 1 and 2 of the drawings there is shown an ambient temperature sensitive fuse 11 embedded in a thermally conductive material, a potting compound comprised of a mixture of asphalt and sand. A fusible link 12 joins the lead terminals 13, 14 and provides a current conduction path between them. As shown in FIG. 1, the lead terminals 13, 14 are stripped of insulation in order to provide a good electrical contact with the link 12. A fuse body 15 made of solid wax material encases the link 12 and serves the purpose of providing a medium into which the link 12 can collapse when it is heated to its melting point. The fuse body 15 is a solid at room temperature and in accordance with the invention has a melting temperature at or below the melting temperature of the fusible link 12 in order to provide a liquid medium into which the fusible link 12 can collapse when it is in a molten state.

The fusible link 12 may be constructed of fusible metallic alloys, such as the lead-bismuth alloys or tin-bismuth alloys which are good electrical conductors and also have relatively low melting temperatures. Since the fuse 11 is triggered when the fusible link 12 is heated to its melting point, the alloy used as a fusible link must have a suitable melting temperature for the particular application. In the illustrative embodiment of the invention it was desired to trigger the fuse 11 at 121 degrees centigrade. A lead-bismuth alloy having a predetermined melting temperature of 121 degrees and the following composition was used:

| Element: | Percentage by weight |
|---|---|
| Bismuth | 55 |
| Lead | 44 |
| Indium | 1 |

To trigger the fuse at 135 degrees centigrade, a fusible alloy having the following composition by weight may be used:

| Element: | Percentage by weight |
|---|---|
| Bismuth | 57.4 |
| Lead | 1.0 |
| Tin | 41.6 |

The fusible alloy to be employed in any given application will depend upon the temperature at which it is desired to trigger the fuse 11.

The fusible link 12 of fuse 11 used to exemplify the invention had a diameter of 1/8 of an inch and a length of 7/8 of an inch. The wax and rosin fuse body 15 was 5/16 of an inch in diameter and 1 1/8 inches in length. The heat dissipated as a result of current flow through the fuse 11 when installed in a ballast and operating at 120 volts A.C. and a current of 3 amperes was negligible. The resistance of the fusible link 12 having a diameter of 1/8 of an inch was found to be approximately .014 ohm.

In the embodiment of the invention illustrated in FIG. 1, the lead-bismuth alloy link 12 was soldered to the lead terminals 13, 14. It will be readily appreciated that the lead terminals 13, 14 may be joined to the fusible link 12 in other ways as will be apparent to those skilled in the art.

Preferably, a wax possessing good thermal and electrical insulating properties and having a preselected melting temperature range may be employed. The wax fuse body may be provided with a protective coating such as a paper wrapping or a silicone resin coating, to prevent diffusion of the potting compound into the wax, to provide improved heat dissipation from the terminal leads 13, 14 when they are soldered to other leads and to maintain the structural configuration of the fuse body 15. The wax may be cast over the fusible link 12 or it may be applied by successively dipping the fusible link 12 in molten wax. Also, a wax in powdered form may be used and briquetted over the fusible link 12 to form the fuse body 15. I have found that it is desirable to use sufficient wax to form a fuse body 15 having a diameter approximately three times that of the fusible link 12. Although in the exemplification of the invention I have used a wax, it will be appreciated that other materials can be used provided that when compounded, the material will have a melting temperature at or slightly below the melting temperature of the fusible link and provided it is compatible with the fusible alloy and the potting compound.

In one embodiment of the invention, I employed as a fuse body 15 a mixture of a rosin having a melting temperature of about 155 degrees centigrade and a high melting temperature wax having a melting temperature of 140 degrees centigrade. In Table I, a summary is presented of various mixtures of rosin and wax to illustrate how the specific composition used was selected.

TABLE I

| Melting temperature (degrees centigrade): | Percent rosin by weight |
|---|---|
| 144 | 0 |
| 140 | 10 |
| 138 | 20 |
| 133 | 30 |
| 126 | 40 |
| 122 | 50 |
| 119 | 60 |
| 116 | 70 |
| 112 | 80 |
| 122 | 90 |
| 155 | 100 |

Using a mixture comprised of 60 percent by weight of rosin and 40 percent by weight of wax, I obtained a material having a melting point of 119 degrees centigrade. The wax used was a synthetic wax ($N_1N^1$-ethylenebis-stearamide). The rosin was a noncrystalline thermo-plastic resin commercially known as Dymerex. Thus, in this embodiment of the invention, the fusible link 12 had a melting temperature of approximately 121 degrees centigrade and the fuse body 15 had a melting temperature of approximately 119 degrees centigrade.

In this embodiment of the invention, the rosin was used primarily for reasons of the economy since the rosin is less expensive than the wax and for the further reason that the rosin serves as a flux to insure that the molten fusible link properly separates from the terminals 13, 14. It was found that where a fuse of the present invention was embedded in an asphaltic potting compound, the acidity of the asphalt and the wax was sufficient to produce a fluxing action.

The condition of the fuse 11 imemdiately upon activation is illustrated in FIG. 3. The fuse body 15 has become a liquid medium into which the molten link 12 collapses. Upon collapse of the link 12, it will be seen that the current conduction path between the lead terminals 13, 14 is interrupted. As shown in FIG. 3, a portion of the molten link 10 is still attached to the lead terminal 14. This condition was found to exist in some of the activated fuses which were examined. However, in some cases, it was observed that the molten fusible link had separated from both lead terminals 13, 14.

In FIG. 4, I have illustrated another embodiment of my invention in which a pair of lead terminals 16, 17 are soldered to a fusible link 18 at the ends thereof in a side-by-side relationship. As in the fuse shown in FIG. 1, the fusible link 18 of FIG. 4 is substantially encased in a fuse body 19 comprised of a wax. The fuse 20 shown in FIG. 4 operates in the same manner as the fuse 11 shown in FIGS. 1, 2, and 3.

Another embodiment of the invention is shown in a fuse 21 illustrated in FIGS. 5 and 6, in which a fuse body 22 is comprised of a substantially rigid tube and a fusible link 23 joining the lead terminals 24, 25 is coated with a flux. The view of FIG. 6 illustrates the condition of the fuse 21 immediately after it has been activated by the ambient heat. The fuse body 22 provides a void wherein the molten fusible link 26 collapses to interrupt the conduction path between lead terminals 24, 25. A rosin flux was applied to the fusible link 23 to retard oxidation and to serve as a flux for the molten link 26 to cause it to freely flow into the void provided by the fuse body 22 and thereby open the circuit.

The fuses 11, 20 and 21 shown in FIGS. 1, 4 and 5 operate in substantially the same manner. When the fusible link 12, 18 or 23 is heated by the ambient environment to its melting point, the molten link collapses in the medium provided by the fuse body 15, 19 or 22, respectively. In the fuses 11 and 20, the fuse bodies 15 and 19, respectively, provide a liquid medium at the melting temperature of the links 12, 18. The fuse body 22 provides a void in which the molten link can collapse to interrupt the current conduction path. It will be seen that the surface tension of the molten link causes it to tend to assume a spheroidal shape. Once the fuses 11, 20 and 21 are activated, the current conduction path is permanently disrupted.

In FIG. 7, the temperature responsive fuse 11 of the invention is shown in a ballast 40 comprising a high reactance transformer 41, a pair of capacitors 42, 43, a radio interference capacitor 44, and a ballast case 45 including a cover plate 46. The transformer 41 is of the shell type and has a magnetic core 39 including an elongated central winding core leg 47 on which the coils 48, 49 are mounted. The coil 48 has a primary winding 50 and three heating windings 51, 52, 53. The coil 49 includes a secondary winding 54. Only the external connections of the ballast transformer 41 are shown in FIGS. 7 and 8. The connections of the transformer windings, 50, 51, 52, 53, 54 are shown schematically in FIG. 9 wherein like reference numerals are used to identify corresponding parts and connections.

A pair of input leads 56, 57 are provided for connecting the ballast to an alternating current power source. As shown in FIG. 9, the lead 56 is intended for connection to the ungrounded side of the power supply and is connected in the ballast circuit to one end of the fuse 11. The other end of the fuse 11 is connected by the lead 58 to a terminal 70 on coil 48 corresponding to the lower end of winding 51 in FIG. 9 (see also FIG. 7). The other input lead 57 is connected to terminal 71 on coil 48 corresponding to the junction between the primary winding 50 and the secondary winding 54 in FIG. 9.

Six external leads 62, 63, 64, 65, 66, 67 are provided for connection to a pair of fluorescent lamps. Leads 62, 63, 65 are connected to terminals 68, 69, 70, respectively, on coil 48. It will be seen that terminal 70, to which lead 65 is joined, also serves as a connection point for one end of capacitor 44. As is shown in FIG. 7, the other end of capacitor 44 is connected to terminal 61. It will be noted that lead 66 is brought out from terminal 71 and lead 67 is brought out from terminal 72 to which lead 73 connecting capacitor 43 is also joined. Terminal 74 serves as a connection point for lead 76 which is connected to capacitor 42.

As shown in FIG. 7, the temperature responsive fuse is connected to the input lead 56 which is for connection to the ungrounded side of the power supply. Thus, it will be seen that when the fuse 11 is activated an open circuit will occur in the input lead 56 and the power to the ballast circuit will be cut off. The fuse 11 is located approximate to the coil 48 and overlies the laminations of the magnetic core 39. In this location, it can readily sense a temperature rise in the coil 48 and in other parts of the ballast 40.

In the partial view of the ballast of FIG. 8, the fuse 11 in accordance with the invention is connected across terminals 59, 77 at a location adjacent to the coil 49. It will be seen that the input terminal 57 is connected directly to terminal 59. Since the start (not shown) of the secondary winding 54 is also connected to terminal 59, the fuse 11 is connected to one end of the primary winding 50. When fuse 11 is activated, it opens the primary winding circuit. The primary winding 50 is therefore disconnected from the power supply and the ballast apparatus fails safe.

In FIG. 9, the circuit diagram illustrates schematically the manner in which the leads and ballast components of FIG. 7 are connected in circuit with a pair of fluorescent lamps 78, 79. The circuit connections of ballast 40 illustrated in FIG. 8 are essentially the same as those shown in FIG. 7, except that fuse 11 is connected in the primary winding circuit between lead 57 and the primary winding 50. Like reference numerals are used in the schematic circuit of FIG. 9 to identify the corresponding components and leads of FIGS. 7 and 8.

As shown in FIG. 9, the input leads 56, 57 are connected to the primary winding 50. The primary winding 50 is connected in autotransformer relation with secondary winding 54. The power factor capacitor 42 is connected in series with the secondary winding 54. Capacitor 43 is provided as an aid in starting the lamps 78, 79 and is connected in parallel with lamp 78. The current for heating the cathodes of the fluorescent lamps 78, 79 is provided by means of the heating windings 51, 52, 53. The capacitor 44 may be connected in the circuit as shown for the purpose of reducing radio interference. A resistor 81 may be connected across capacior 42 to discharge the capacitor 42 when the ballast 40 is disconnected from the power source.

In both illustrative embodiments of the invention shown in FIGS. 7 and 8, the fuse 11 of the invention is located adjacent to the magnetic core of transformer 41 and in proximity to one of the coils 48, 49. Preferably, the fuse 11 is located near a coil since short circuits in the coil winding are frequent causes of ballast failures. Further, its proximity to the core steel will permit the fuse 11 to readily sense temperature rises in other parts of the ballast 40. It will be readily appreciated that the fuse 11 can be located at other locations in the ballast case 45.

Thus, the fuses of this invention will disconnect an electrical device from a power supply in response to the ambient temperature in the vicinity of the fuse. The fuse can be readily designed to open a circuit at a wide range of temperatures and can be manufactured from relatively inexpensive materials.

While this invention has been explained by describing several exemplifications thereof, it will be apparent that many modifications may be made without departing from the spirit and scope of the invention as defined in the appended claims.

What I claim as new and desire to secure by Letters Patent of the United States is:

1. A temperature responsive electric fuse for use within a thermally conductive material, said temperature responsive fuse comprising a pair of lead terminals, a fusible metal link having one end attached to one of said lead terminals and having the other end attached to the other one of said lead terminals to provide a current conduction path therebetween, said fusible metal link having a predetermined melting temperature range and being activated to a molten state essentially in response to the temperature of the ambient environment of said fuse, a fuse body comprising means for producing a fluxing action and thereby enhancing the fusion of said metal link when activated to said molten state, said fuse body substantially encasing said fusible metal link, said fuse body having a melting temperature not greater than said predetermined melting temperature range of the fusible metal link thereby to provide a liquid medium into which said molten link can freely sink and separate from said lead terminals thereby interrupting the current conduction path.

2. A temperature responsive electric fuse comprising a pair of lead terminals, a fusible link having one end attached to one of said lead terminals and having the other end attached to the other of said lead terminals to provide a current conduction path therebetween, said fusible link having a predetermined melting temperature range, a fuse body having a predetermined melting temperature range not greater than the melting temperature of said fusible link, said fuse body substantially encasing said fusible link and melting at said predetermined melting temperature range to provide a liquid medium for the fusible link thereby to permit the molten fusible link to separate and interrupt the current conduction path, and a fluxing means in contact with said fusible link for providing a fluxing action to enhance fusing of said metal link whereby disruption of said fusible link is insured when said fusible link is melted at said predetermined temperature range.

3. A temperature responsive electric fuse for operation within a thermally conductive material, said temperature responsive electric fuse comprising a pair of lead terminals, a fusible alloy link having one end attached to one end of said terminals and having the other end attached to the other one of said lead terminals to provide a current conduction path therebetween, said fusible link having a melting point at a first predetermined temperature range and being activated to a molten state in response to the temperature of the ambient environment of said fusible link, a meltable fuse body having a melting temperature at a second predetermined range not greater than said first predetermined melting temperature range, said fuse body substantially encasing said fusible link and melting at said predetermined range to provide a liquid medium for said fusible link at said second predetermined temperature range thereby to permit the collapse of said fusible link and interruption of the current conduction path when said fusible link is activated to a molten state, said fuse body including a fluxing means around said fusible link for enhancing the fusion of said metal link when activated to said molten state.

4. The temperature responsive electric fuse as set forth in claim 3 in which the meltable fuse body is comprised of wax.

5. The temperature responsive electric fuse for operation in a thermally conductive material, said temperature responsive electric fuse comprising a pair of lead terminals, a fusible alloy link having one of said lead terminals attached at each end to provide a current conduction path between the lead terminals and having a melting point at a first predetermined temperature range, and a resinous material fuse body substantially encasing said fusible alloy link and having a melting point at a second predetermined temperature range less than said first predetermined temperature range and providing a molten medium when said fusible link melts wherein the molten link is free to collapse and interrupt the current conduction path, said fuse body providing a fluxing action to enhance the fluidity of the molten link, said fusible alloy link and said fuse body being activated to a liquid state essentially in response to the temperature of the ambient environment.

6. A temperature responsive electric fuse for operation in an asphaltic potting compound, said temperature responsive electric fuse comprising a pair of lead terminals, a fusible bismuth-lead alloy link having one of said lead terminals attached at each end to provide a current conduction path between the lead terminals and having a melting point at a first predetermined temperature range, a mixture of wax and rosin forming a fuse body substantially encasing said link and having a melting point at a second predetermined temperature range less than said first predetermined temperature range, said fuse body providing a molten medium within said asphaltic potting compound wherein the link when melted at said first predetermined temperature range is free to collapse and interrupt the current conduction path between said lead terminals, said rosin providing a fluxing action to enhance the fusion of said molten link.

7. In a ballast which is energized from a source of A.C. current for igniting at least one gaseous discharge device and said ballast has an energizing circuit which is required to be opened when the operating temperature of the ballast exceeds a prescribed value, a disconnect device connected in the energizing circuit instantaneously to open said circuit when said temperature value is exceeded, said disconnect device comprising a pair of lead terminals, a solid metal link connected to said terminals and formed of solder metal material selected to melt when said temperature value is exceeded to open said circuit and having an exterior, relatively thin, sheath coating of fluxing material in intimate contact with the link so as to dissipate oxides accumulating on perimetric surface areas of the metal link and prevent the melted metal from holding together so that said circuit will be opened instantaneously, and a fuse body surrounding said solid metal link for providing a medium into which said link may collapse when molten.

8. A disconnect device as claimed in claim 7 in which said fluxing material is primarily wood rosin.

9. In a ballast which is energized from a source of A.C. current for igniting at least one gaseous discharge device and said ballast has an energizing circuit which is required to be opened when the operating temperature of the ballast exceeds a prescribed value, the said ballast assembled within a canister immersed in a potting compound; thermal disconnect means electrically connected in said energizing circuit of said ballast instantaneously to open said circuit when the temperature of the ballast exceeds said temperature value comprising, a housing adapted to be installed interior of said canister, a solid metal link disposed in said housing and formed of solder metal material selected to melt when said temperature value is exceeded to open said circuit, said housing providing an environment into which said metal link can collapse when melted, and a rosin material disposed within said housing and surrounding said link to enhance the fluidity of said metal link when said temperature value is exceeded and thereby causing said link to instantaneously separate and open said circuit upon melting of said link metal.

References Cited

UNITED STATES PATENTS

| | | | |
|---|---|---|---|
| 1,957,565 | 5/1934 | Wheeler | 200—143 |
| 2,342,320 | 2/1944 | Ziegel | 200—142 |
| 2,412,737 | 12/1946 | Kercher | 200—143 |
| 2,557,926 | 6/1951 | Swain et al. | 200—135 X |
| 2,791,660 | 5/1957 | Sims et al. | 200—117 |
| 2,956,210 | 10/1960 | Yatsushiro | 317—15 |
| 3,201,646 | 8/1965 | Mansfield | 200—135 X |

FOREIGN PATENTS 115,479    4/1918    Great Britain.

BERNARD A. GILHEANY, *Primary Examiner.*

H. B. GILSON, *Assistant Examiner.*